(No Model.)
M. LOOMIS.
ELECTRICAL THERMOSTAT.
No. 338,090. Patented Mar. 16, 1886.
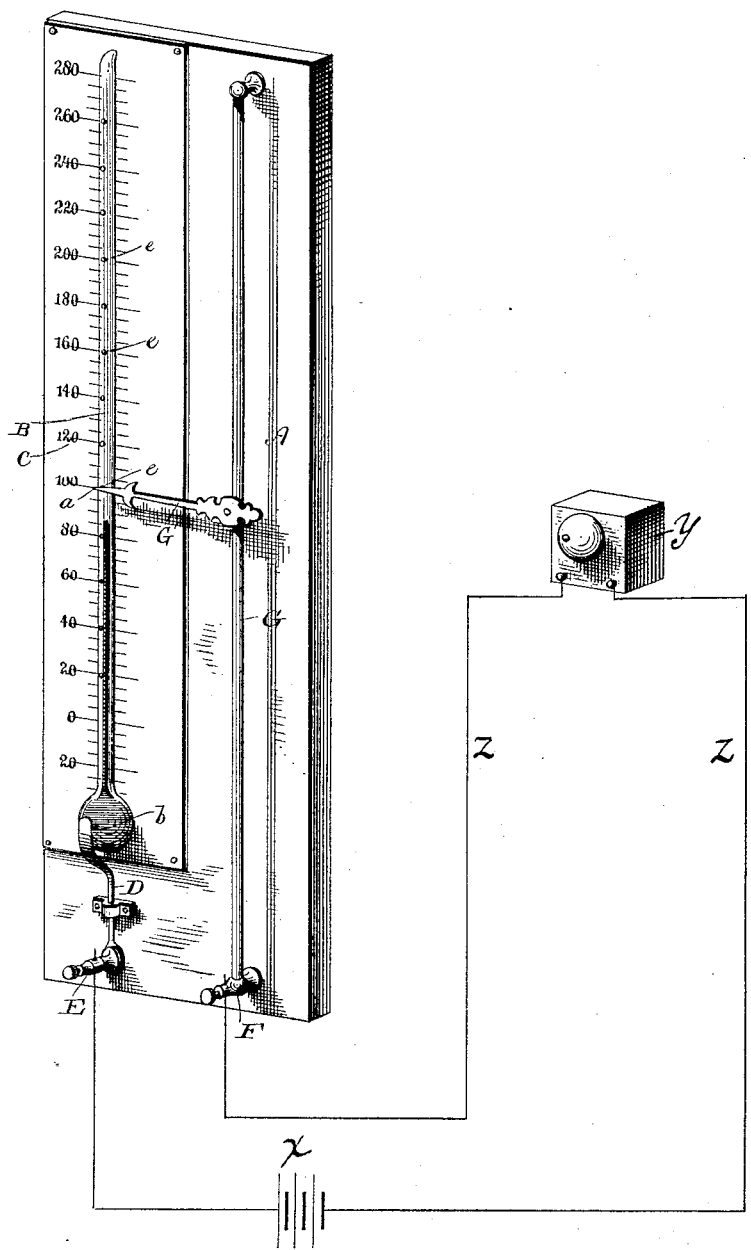
WITNESSES
F. L. Ourand
C. H. Ourand
INVENTOR
M. Loomis
Attorney

United States Patent Office.

MAHLON LOOMIS, OF TERRA ALTA, WEST VIRGINIA.

ELECTRICAL THERMOSTAT.

SPECIFICATION forming part of Letters Patent No. 338,090, dated March 16, 1886.

Application filed November 6, 1885. Serial No. 182,010. (No model.)

*To all whom it may concern:*

Be it known that I, MAHLON LOOMIS, a citizen of the United States, residing at Terra Alta, in the county of Preston and State of West Virginia, have invented certain new and useful Improvements in Electrical Thermostats; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

My invention has relation to alarm-thermometers or electrical thermostats, whereby an alarm may be sounded and notice given to an attendant when a given temperature is reached without the necessity of watching the thermometer; and to this end the novelty consists in an ordinary thermometer provided with metallic connection in the bulb and similar connections along the scale—say every five or ten degrees—whereby a sliding connection or contact may complete an electrical circuit and sound an alarm when the column of mercury in the thermometer rises to the point where the adjustable scale has been previously set, as will be hereinafter more fully described.

The figure in the drawing is an elevation of my improved electrical thermostat or alarm-thermometer.

A is the base-plate, of any approved non-conducting material.

B is the thermometer-tube, mounted in the usual manner upon the scale C. This tube B is provided with an electrical or metallic connection, b, preferably of platinum, projecting a short distance through the bulb, so as to make contact with the mercury, and a flat or leaf spring, D, which in turn connects with the terminal screw-post E, so that the column of mercury in the tube is at all times in electrical or metallic connection with the said screw-post. The tube itself is provided with a series of platina points, e, similar to the one b in the bulb, and they are set at convenient distances on the scale to suit the use to which the instrument is to be applied.

F is the other terminal screw-post, and it is in electrical connection with a guide-rod, G, secured to the base-plate A, parallel to the thermometer-tube.

G' is a metallic index-hand or pointer, adjustably secured to the guide-rod G, so as to slide freely up and down to correspond to the length of the scale. The end $a$ of this hand G projects over the tube, so as to successively come into contact with each of the points $e$, whereby, when the end $a$ of the hand is adjusted to one of the points $e$, the said point will be in electrical connection with the screw-post F through the medium of the index-hand and guide-rod.

In operation the invention is used as follows: A battery, X, and vibrating bell Y, or other alarm, being in the circuit Z, with the screw-posts E and F, and the index-hand being adjusted to the point $e$ on the scale at, say, 100°, when the temperature increases, expanding the mercury until it reaches the hundredth degree on the scale, the entire electrical circuit will be completed and the alarm sounded, and continue ringing until the temperature falls or the circuit is otherwise interrupted.

The various uses to which my improved electrical thermostat or alarm-thermometer may be applied will readily suggest themselves to those skilled in the art to which it appertains, among the more important of which may be mentioned governing the temperatures of dental vulcanizers, its ready application to shaft bearings and journals in machinery; also for indicating the rise or fall of the mercurial column in barometers; also for detecting and giving an alarm in case of fires—in fact, its usefulness will be appreciated in any case where it is necessary to give warning of an increase or decrease of temperature.

Having thus fully described my invention, what I claim as new and useful, and desire to secure by Letters Patent of the United States, is—

1. The combination, with an alarm and a battery-circuit, of the thermometer-tube provided with a bulb-connection and a series of independent tube-connections, a guide-rod, and an adjustable index-hand sliding thereon in electrical connection therewith, as and for the purpose set forth.

2. The combination, with the battery X, alarm Y, and circuit Z, of the tube B, having connecting-points $b$ and $e\ e$, the contact D, and the guide-rod G, provided with the adjustable index-hand G', as and for the purpose set forth.

In testimony whereof I affix my signature in presence of two witnesses.

MAHLON LOOMIS.

Witnesses:
WM. T. WHITE,
W. O. POSTEN.